(12) United States Patent
Moore (10) Patent No.: US 6,766,514 B1
(45) Date of Patent: Jul. 20, 2004

(54) COMPILER HAVING REAL-TIME TUNING, I/O SCALING AND PROCESS TEST CAPABILITY

(75) Inventor: Michael D. Moore, Alplaus, NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/421,094

(22) Filed: Oct. 19, 1999

(51) Int. Cl.[7] .................................................. G06F 9/45
(52) U.S. Cl. ..................... 717/159; 717/131; 717/141; 717/145; 717/154
(58) Field of Search ........................ 717/159, 160–161, 717/152, 155, 141, 131, 145, 154

(56) References Cited

U.S. PATENT DOCUMENTS

| | | | |
|---|---|---|---|
| 5,093,916 A | 3/1992 | Karp et al. ................. | 395/700 |
| 5,193,180 A * | 3/1993 | Hastings .................... | 717/163 |
| 5,201,050 A | 4/1993 | McKeeman et al. ........ | 395/700 |
| 5,230,050 A | 7/1993 | Iitsuka et al. .............. | 395/700 |
| 5,313,387 A | 5/1994 | McKeeman et al. ........ | 364/400 |
| 5,335,344 A | 8/1994 | Hastings .................... | 395/575 |
| 5,586,328 A * | 12/1996 | Caron et al. ................ | 717/112 |
| 5,758,061 A | 5/1998 | Plum | |
| 5,805,894 A | 9/1998 | Robison .................... | 395/709 |
| 6,021,275 A * | 2/2000 | Horwat ...................... | 717/147 |

FOREIGN PATENT DOCUMENTS

| | | |
|---|---|---|
| WO | WO 93 25964 | 12/1993 |

OTHER PUBLICATIONS

IBM Technical Disclosure Bulletin, "Interactive Compiler", vol. 15, No. 12, pp.: 3745–3750, May 1973.*

Krueger, "Software Reuse", ACM, pp. 131–183, Jun.1992.*

R.A. DeMillo, "Compiler–Integrated Program Mutation*," Tokyo, Sep. 11–13, 1991.

PCT/US00/26264, International Search Report mailed Oct. 19, 2000.

* cited by examiner

*Primary Examiner*—Tuan Dam
*Assistant Examiner*—Ted T. Vo
(74) *Attorney, Agent, or Firm*—Karl Vick; Kevin Duncan; Hunton & Williams LLP (57) ABSTRACT

A compiler and compiling method providing modification of a value of a variable at run-time of a computer program wherein additional space in memory is allocated for variable modification parameters, assembly or object code is added upon compilation of the computer program, the added code being dependent on the variable modification parameters, and the value of the variable is modified at run time based on the added code and at least one of the variable modification parameters such that the value of the variable at run time is set to be equivalent to at least one of a fault value, a value multiplied by a predetermined gain and a value offset from the value of the variable or remains unchanged (unscaled) if so desired. The application of the compiler functionality or method is preferably controllable by a software switch for individual and/or all variables.

31 Claims, 8 Drawing Sheets

```
typedef struct
{
    int Switch;
    double gain;
    double Offset;
    double FaultValue;
} Points[SpaceSize];

(*FORTRAN_VARIABLE) = (*FORTRAN_VARIABLE) * Points[VariableNumber].Gain
+ Points[VariableNumber].Offset;
```

```
A = 1
B = 5
C = A*B mov         dword ptr [A],00000001
mov         dword ptr [B],00000005 mov         eax,dword ptr [B]
imul        eax,dword ptr [A]
mov         dword ptr [C],eax
```

COMPILER HAVING REAL-TIME TUNING, I/O SCALING AND PROCESS TEST CAPABILITY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is directed to computer software compiler technology and more particularly to a computer compiler that has the capability of inserting in assembly or object code additional code that permits real time scaling, faulting and modulation of variables without having to modify associated source code.

Software development is characterized by a process involving the steps of writing and editing a program, compiling and linking the program and running the program. A compiler translates a source program that has been written in a high-level language such as FORTRAN, PASCAL or C/C++ into a machine executable form known as an object program. Improvements in compiler technology are typically associated with optimizing the object code that is generated so that at run-time, the program runs as efficiently, and thus as quickly, as possible. Examples of such compiler improvements can be found, for example, in U.S. Pat. No. 5,313,387 to McKeeman et al. and U.S. Pat. No. 5,335,344 to Hastings. However, speed and efficiency are not necessarily the only improvements available in a compiler or compilation process. Improved functionality, even in exchange for efficiency, is sometimes desired.

High level languages such as FORTRAN have been in existence for 30 years or more. Despite their age, these languages continue to be used. In fact, FORTRAN source code that was written decades ago might still be used by present day software engineers even though these engineers have no knowledge of the substance and character of that source code. These software engineers rely on the fact that the source code, when compiled, provides the expected functionality. The present inventor has experienced this phenomenon with respect to simulation software used to design, build and control controllers for power generation equipment, wherein at least a portion of the simulation software source code relied upon was written years ago, but is nevertheless still used as it represents a fully developed and reliable portion of an overall program. It is believed that design and software engineers in other technological fields have similar experiences with older source code blocks.

While reliance on old source code is advantageous due to its reliability, etc., there is a disadvantage to its use in that, should it be desirable to modify the older source code to provide a somewhat different functionality, that is, to control the output thereof, such a modification could unexpectedly modify the overall program in an unintended and difficult-to-recognize way. Indeed, it is common for software engineers to leave older source code in its original form so as not to overly complicate software development.

Nevertheless, there are times when it is highly desirable to control the output of portions of a program that rely on older, unfamiliar source code. For example, in order to test newly written source code, it is helpful if the variables being output from the older source code and used as input to newly written code blocks can be modified to analyze, for example, boundary conditions or particular values of interest, such as a fault value, in the newly written portions of the program. However, it is generally ill-advised to modify the older source code directly in fear of interjecting software "bugs" that likely will be difficult to correct in view of the low level of familiarity with the older source code. Moreover, modification of the older source code results in multiple revisions being available to other software engineers, which leads to configuration management difficulties.

Figure 1:
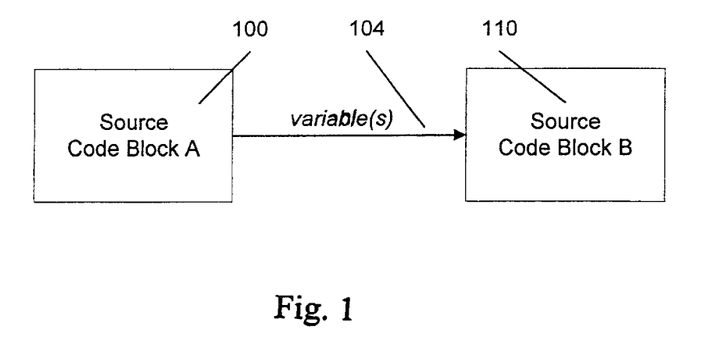
FIG. 1 illustrates conventional progression of variables in a program.
Figure 2:
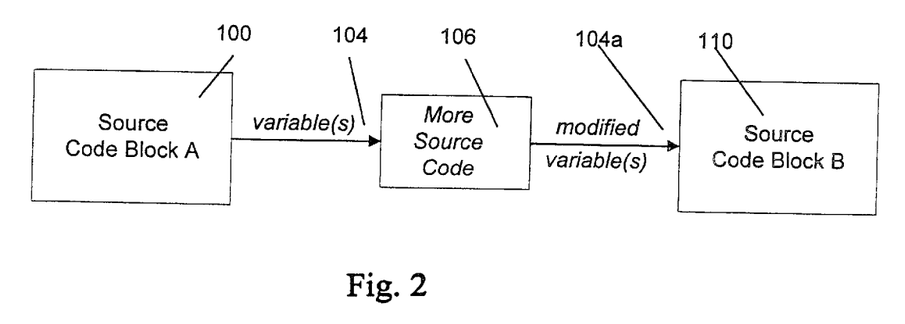
FIG. 2 illustrates a prior art implementation of variable modification via user-defined code that is recompiled.

There are known methods by which variables of a computer program can be modified. Specifically, simulation languages such as Boeing's EASY5™, Simulink™ and similar programs provide means for intercepting variables 104 as they flow, in a conventional manner, from an upstream code block 100 to a downstream code block 110 (FIG. 1). As shown in FIG. 2, this "intercepting" capability usually means stopping the simulation, inserting user defined variable modification code 106, recompiling the changed code, and running the simulation with the new capability, i.e., modified variables 104a. This process is time consuming, prone to errors where a large number of variable connections exist, and generally results in larger and more complex (less easy to understand) code. It also dictates that FORTRAN legacy code, for example, must be changed repetitively, introducing revision control and simulation model accuracy difficulties. As used herein, "legacy code" refers to the older, less familiar source code.

Figure 3:
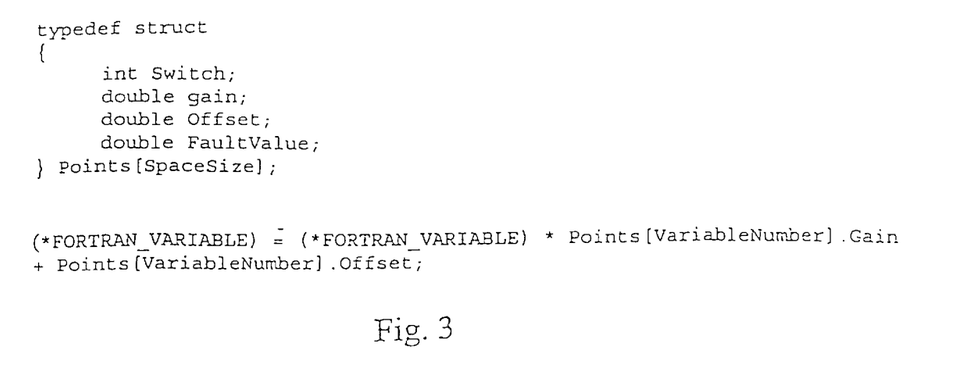
FIG. 3 illustrates another prior art implementation of variable modification via user-defined space.

Also known are source code modification and compilation-based techniques for introducing variable scaling capabilities, such as the aforementioned code insertions and the employment of user defined variable spaces, as shown in FIG. 3, here in 'C' language notation, where user-written routines access information stored about program variables including, for example, gain and offset, and perform the desired scaling. A fault value can also be accessed depending on the value of the "switch" variable. However, this technique results in yet another layer of source abstraction that may conflict with existing simulation programs (e.g., EASY5™, Simulink™, etc.). Indeed, these compilation-based techniques typically require (a) manual creation of user code that is aware of the address, data type and name of the variables in the so-called legacy code, (b) modification of the legacy source code to intercept all assignment references, e.g. intercepting A=B and replacing the same with A=B*GAIN +OFFSET, to scale internal variables, and (c) explicit linking with the object code produced from the legacy source code.

Thus, the above and the aforementioned variable control schemes do not solve the problem of user definition and addition of scaling capabilities for variables without source code modifications.

BRIEF SUMMARY OF THE INVENTION

Thus, there is a need to provide access to and manipulation of variables during run time of an executable program produced from, for example, FORTRAN source code, without modification of the same FORTRAN source code. More specifically, there is a need to provide this functionality without the additional source code modification 106 shown in FIG. 2, or the creation of user-defined variable space followed by source modification as shown in FIG. 3.

Hereinafter reference is made to the FORTRAN programming language and compilers therefor, but it is to be understood by those skilled in the art that the method and apparatus described herein is applicable to any software programming language compiler.

In accordance with a preferred embodiment, the functionality of a FORTRAN compiler is extended to achieve real time variable manipulation. More particularly, disclosed is an improved compiler that takes normal variable move and assignment operations and adds assembly language, and ultimately, object code, that allows real time scaling, faulting, and modulation of FORTRAN variables without the modification of FORTRAN legacy (well-established, revision controlled) source code. The application of the functionality of the improved compiler is preferably controlled by the user, and when the particular functionality is not desired, the compiler preferably reverts to normal interpretations of the FORTRAN language. This control is preferably effected via a software switch. Such a capability is particularly useful for real time simulation process monitoring, tuning, I/O scaling and fault generation since variables can be manipulated without having to change source code or having to recompile with scaling parameters in changed source code. Such monitoring, tuning, scaling and like functions are particularly useful with FORTRAN-based simulation programs such as Boeing's EASY5™.

When the functionality of the preferred embodiment of the compiler is activated and if a variable is specified in one of at least a compiler switch command line, in an auxiliary file, a language extension/compiler directive, or a compiler switch modifier indicating "all" variables, the preferred embodiment:

(1) treats each variable normally in the parse of the FORTRAN source, but allocates additional space for variable modification parameters, such as a "fault_value" (i.e., a value to insert rather than the upstream, or left hand side) variable, a "gain," an "offset," and a multi-position "switch" to control the use of fault_value, gain, and/or offset parameters;

(2) during compilation, inserts assembly code (or object code) to apply the fault_value, gain, offset, and switch to a variable, thus not altering the FORTRAN source code, yet providing the capability for real time variable modification in the resulting executable; and (3) provides means for initializing, storing and accessing the fault_value, gain, offset, and switch variables at run time.

The advantages of the preferred embodiment include:

No FORTRAN source code changes;

No complications/additions to legacy FORTRAN;

Elimination of user-defined scaling implementations, rework, and the like;

Capability is transparent to the user, and easily selectable with a compiler switch;

Capability is intrinsic in the compilation process, no user code needs to be generated; and Intrinsically supplies I/O points with scaling/faulting capabilities.

DETAILED DESCRIPTION OF THE INVENTION

Figure 4:
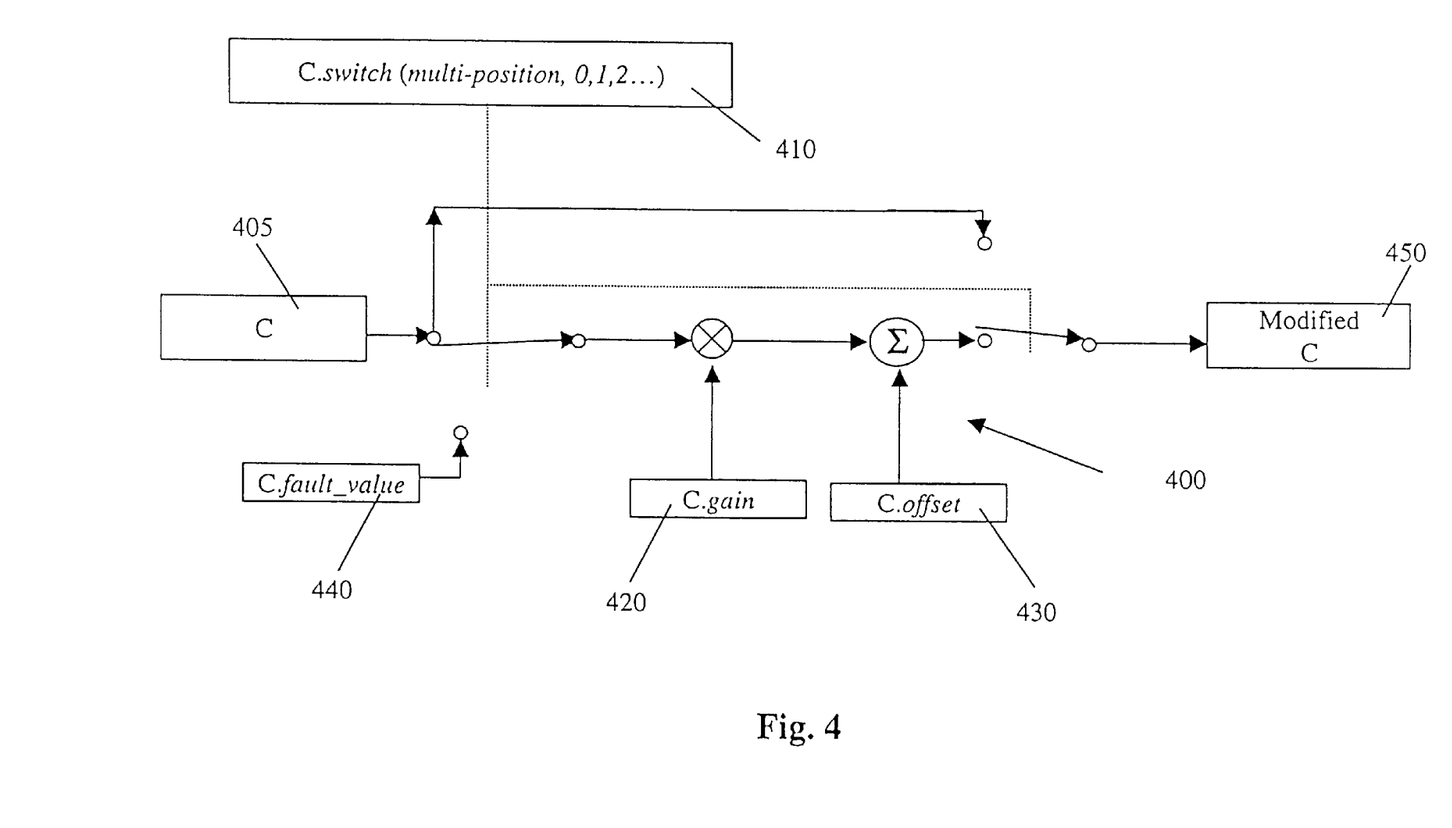
FIG. 4 shows in block diagram form an implementation of a preferred embodiment of the invention.

The preferred embodiment of the present invention is an improvement to conventional compilation procedures and compilers for specified (and up to and including all) variables, and is illustrated, generally as 400, in block diagram form in FIG. 4 for a hypothetical FORTRAN variable C, element 405. In accordance with the preferred embodiment, FORTRAN variables are modified via compiled code to implement the additional features shown in FIG. 4, as will be explained further herein below.

Operation on each or on a single variable is as follows (illustrated here with only the variable C). Depending upon the state of a multi-position software switch C.switch 410, the variable C is modified using the C.offset 430, and C.gain 420 is applied to produce a modified C 450. If it is so desired, C.switch can be changed in real time to simply copy C 405, into modified C 450, which will then be used in subsequent (downstream) routines. If the C.switch is so set, a C.fault_value 440 is sent to downstream routines and can be scaled in accordance with C.gain 420 and C.offset 430 as desired. Also, preferably, if the switch 410 is not set, i.e., a default circumstance, the original, unmodified variable C 405 is made available to downstream routines.

Figure 8:
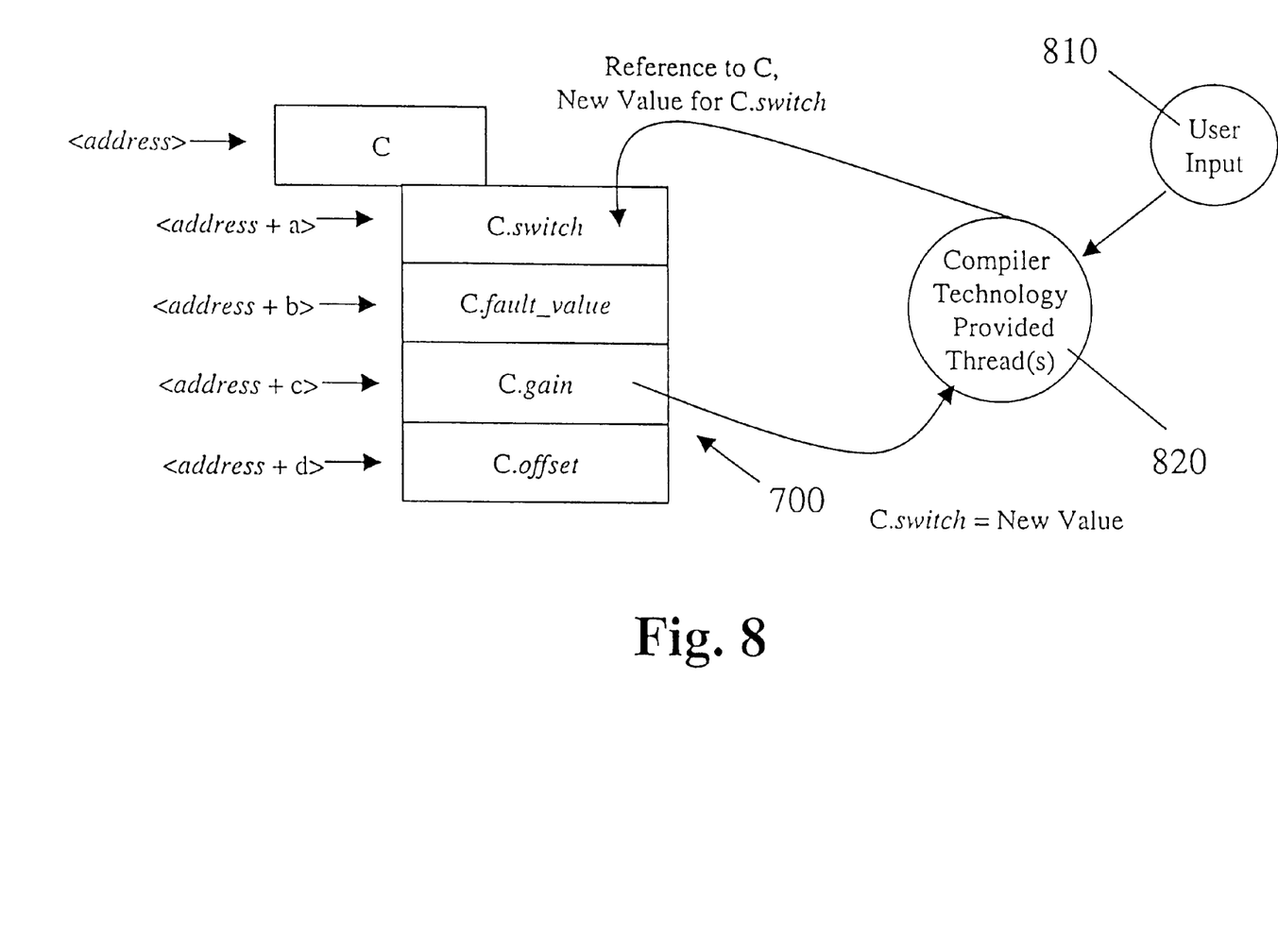
FIG. 8 shows schematically the implementation of user-initiated threads in a preferred embodiment of the invention.

A significant feature of the preferred embodiment is that the functionality of FIG. 4 is effected without the inclusion of additional FORTRAN code in the original source code. In the preferred embodiment, the preliminary settings of C.gain, C.offset, C.switch and C.fault_value, which can be collectively referred to as variable modification parameters, are default values with the opportunity to modify same in real time via threads, as shown in FIG. 8 and explained in more detail below.

Figure 5:
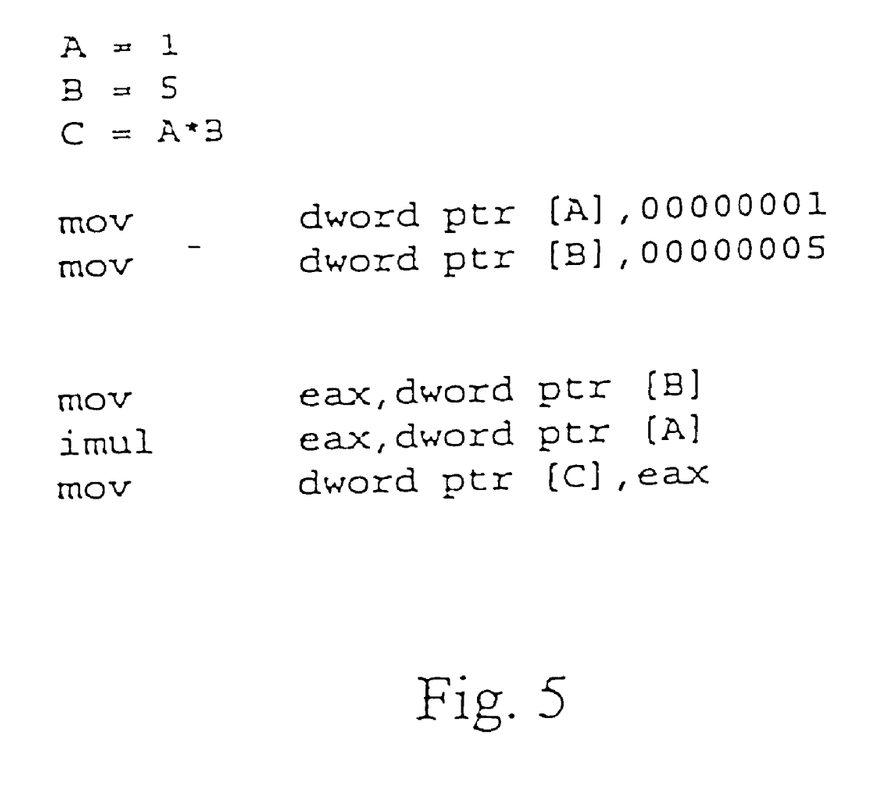
FIG. 5 shows source code and its associated resulting conventional assembly code analog.

Referring now to FIG. 5, FORTRAN statements are conventionally compiled into the depicted (in this case Intel™) assembly code, also shown in FIG. 5. An INTEGER value is shown here for simplicity, but the preferred embodiment applies also to REAL variables. The preferred embodiment can also be applied to LOGICAL types by ignoring the gain and offset functions. That is, a C.fault_value can be used to control the value of a particular LOGICAL type variable. As can be seen in FIG. 5, after execution, the variable C cannot be modified for blocks of code downstream other than by modifying the inputs that produce C, namely, A and B.

However, in simulation environments in particular, it may be desirable to be able to modify a variable such as C without affecting A or B. Indeed, variables A and B may actually be physical parameters (such as a gravitational constant "g") that cannot be changed without affecting other calculations, or C may be a variable that is itself a result of calculations that must be traced back through the source code. However, changing these calculations may detrimentally affect other portions of the software program.

It is desired then to directly manipulate a variable such as C for tuning or testing blocks of code that use the variable C downstream, without using parameters or tracing back though extensive legacy source code for other variables that comprise or lead to C.

Accordingly, the compiler according to the preferred embodiment compiles the three simple lines of FORTRAN code of FIG. 5 into a form that implements the block diagram of FIG. 4, thereby providing the ability to manipulate and scale the variable C as is desired by the user in real time. The preferred assembly code resulting from the compilation of the same three lines of FORTRAN source code in accordance with the preferred embodiment is shown in FIG. 6, again in Intel™ assembly code.

Figure 6:
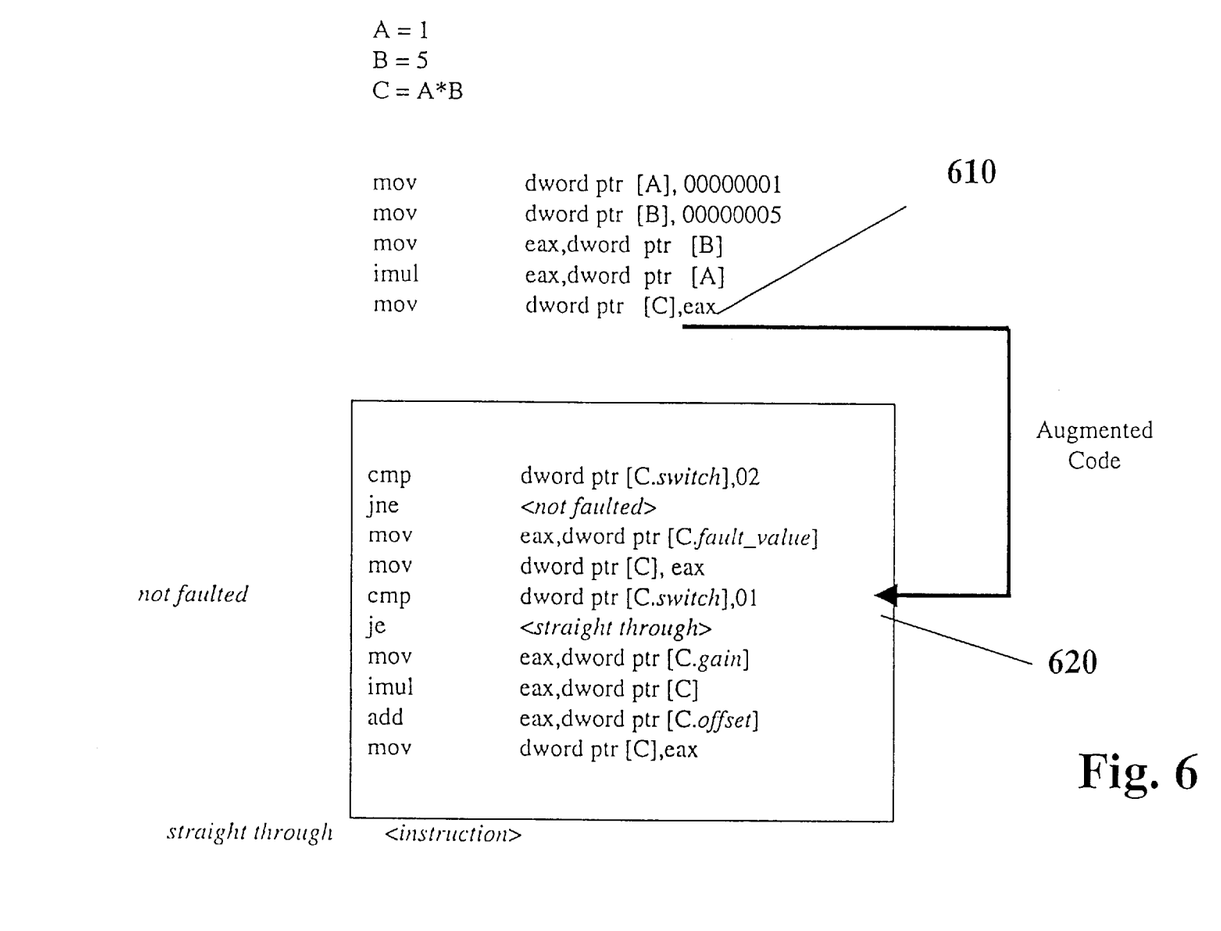
FIG. 6 shows the additional assembly code provided by a preferred embodiment of the invention.

In this Figure, the conventional resulting assembly language is augmented to include example conditional tests and jumps on the compiler-created variable C.switch, and the use of C.fault_value, C.gain, and C.offset to implement the block diagram of FIG. 4. That is, code line 610 is augmented by code lines 620. Specifically, we consider the designations C.switch=0 meaning modify variable C 405 with C.gain 420 and C.offset 430, C.switch=1 pass variable C 405 through unmodified, and C.switch=2, employ C.faultvalue 440. With C.switch=0, a compare against literal 02 yields a non zero value, which causes a jump (branch) to line not faulted. The contents of variable C 405 are left unchanged at this juncture. Since C.switch=0, no jump is executed to straight through, C.gain 420 is moved into the accumulator, and in the next line multiplied with variable C 405 and the result put into the accumulator (imul line). Finally, C.offset 430 is added to the accumulator (eax) in the add line, and the result is stored in the memory location for variable C 405 (mov dword ptr [C], eax).

Similarly, if C.switch=1, no fault value is used as above and the code branches to straight through, and the contents of variable C 405 are not modified by C.gain 420 and C.offset 430.

Finally, if C.switch=2, C.fault_value 440 is moved into the contents of variable C 405, no jump is taken to line straight through, and C.gain 420 and C.offset 430 are applied to C.fault_value 440 as in FIG. 4.

Figure 7:
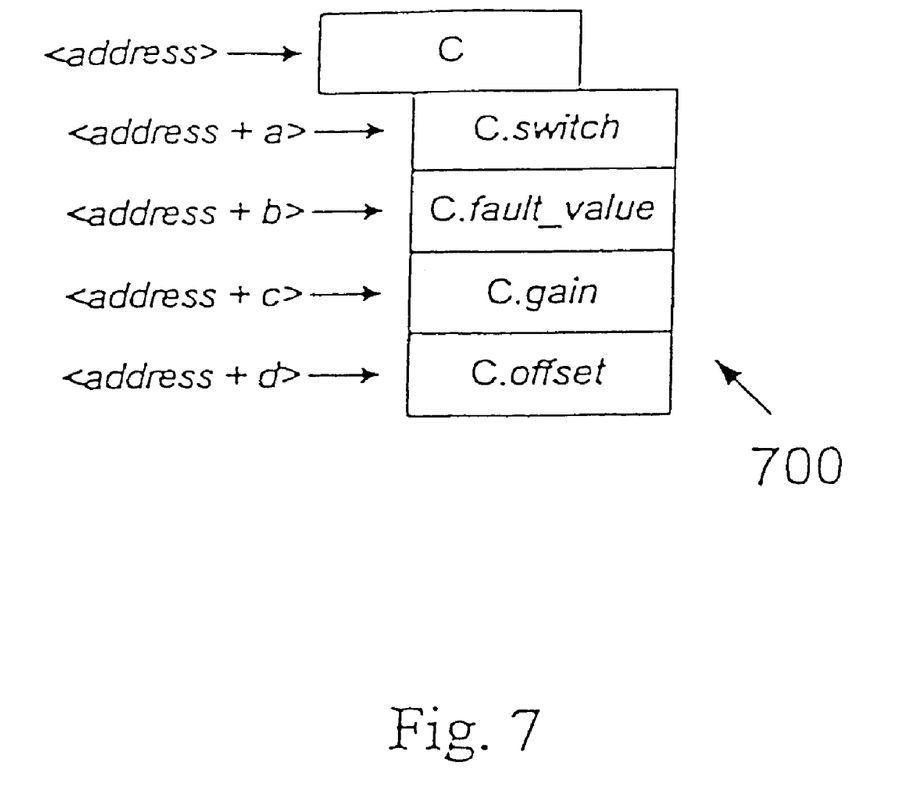
FIG. 7 shows a relationship of a hypothetical FORTRAN variable C to its C.xx variables provided by a preferred embodiment of the present invention.

Additionally, the described xx.switch, xx.fault_value, xx.gain, and xx.offset variables in the example above created by the compiler according to the preferred embodiment can be indexed off of the original (source) variable by set address offsets, e.g., "a", "b", "c" and "d", as indicated by 700 for the hypothetical FORTRAN variable C shown in FIG. 7, so that the actual values of C.switch, C.fault_value, C.gain, and C.offset can be identified and changed in real time and accessed by compiler-provided reference off of the address of the original variable in question (again the hypothetical FORTRAN variable C).

Thus, with knowledge of the location of the original variable C, the compiler in accordance with the preferred embodiment allocates, for example, non-volatile memory and addresses therefor, initializes default values (such as C.gain =1.0, C.offset =0.0), and allows real time access and manipulation of the C.switch, C.fault_value, C.gain, and C.offset variables (also created by the preferred embodiment) using reference to the original variable (here, for example, C) in additional thread(s) of execution to receive and process the real time user input for modifications (for example, variable C). Such thread(s) of execution can be stored in a compiler-supplied library and initialized with the variable names and addresses in question, performing real time modifications to variables based on recognition of variable name and association with the variable address, etc., as shown in FIG. 8.

The term "threads" as used herein refers to asynchronously (not serially in line with any other code) schedulable (when a microprocessor executes their code downstream) pieces of code that are usually associated with asynchronous events (i.e. not predictable) from the outside world. A typical example of such a thread is one that waits for a user input from the keyboard, and reacts when a key is pushed. The thread does not typically poll constantly to check the keyboard, but is "wakened" by the system when a key is struck, i.e. like an interrupt driven event.

In the context of the preferred embodiment, the described threads indicate that a user's changing of the various parameters is asynchronous, and object code representative of the threads is preferably not part of the object code from the original legacy source code. As such, the object code of the threads contemplated by the preferred embodiment is not generated at each compilation. Thus, a user can, via user input 810 and threads 820, modify the parameters xx.switch, xx.fault_value, xx.gain, and xx.offset in real time via a keyboard, mouse or other suitable input device to a computer (not shown).

Figure 9:
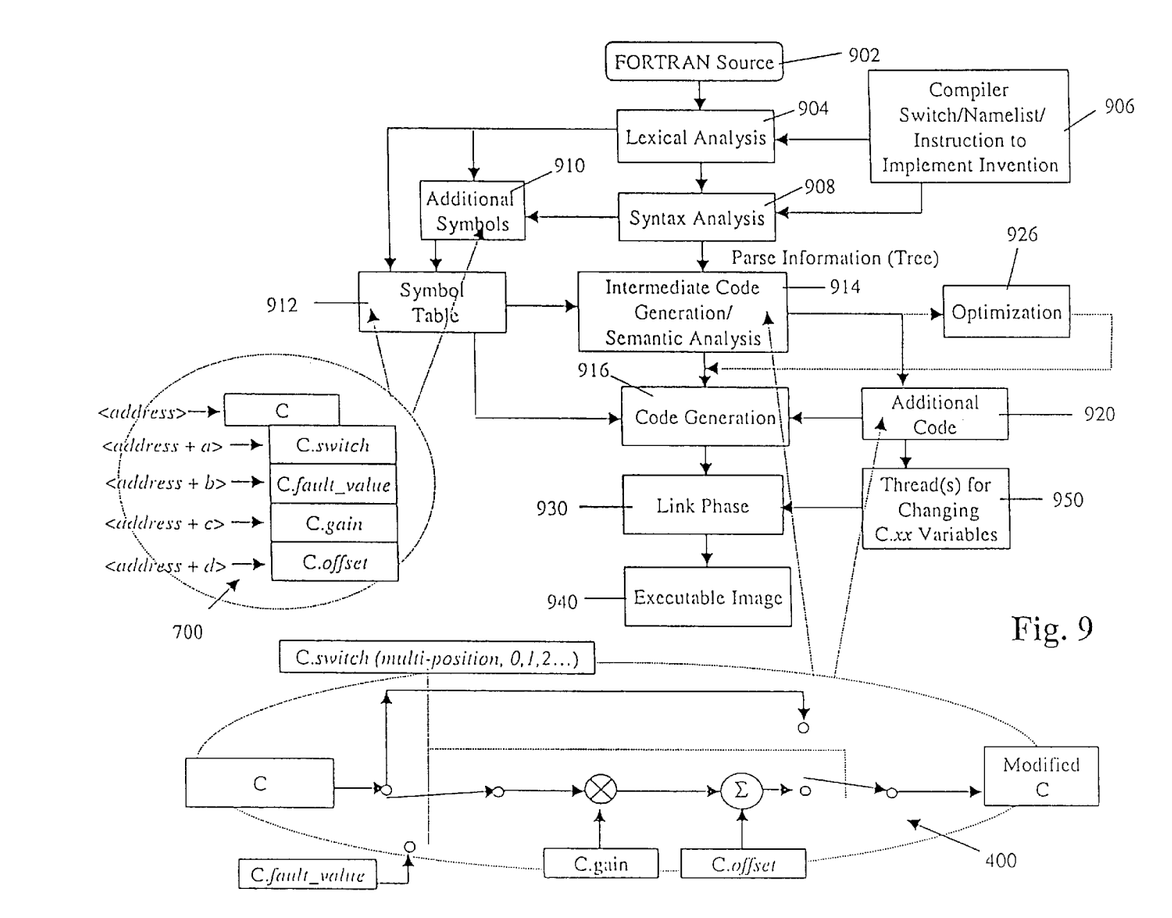
FIG. 9 shows compilation steps in accordance with a preferred embodiment of the present invention.

FIG. 9 illustrates an exemplary compilation process for implementing the preferred embodiment for a single hypothetical variable C. Compilation begins by specifying whether to implement the functionality of the preferred embodiment via a software or compiler switch, variable namelist (which identifies particular variables for which the functionality is desired), or a specification that "all" variables are to be effected, as shown by block 906. Then, starting with FORTRAN source code 902, the next step in compilation is lexical analysis 904 and syntax analysis 908 wherein the FORTRAN source is examined for lexical and syntactic structure. These latter two processes are well known in the art. Upon determination(s) of the assignment operator (usually the "=" lexeme, although other lexemes can be implemented) for variable C, for example, the variable is checked against the variable namelist, or, if "all" variables have been specified for modification, the implementation of the added code in accordance with the preferred embodiment of the invention is effected. Specifically, the variable in question (e.g., C) is added to the Symbol Table 912, along with the additional desired variables, i.e., the collection of variables of the form C.xx, as shown by 700 (FIG. 7), via Additional Symbols block 910. These variables are then made available to the Intermediate Code and Code Generation routines 914, 916, which routines are also well known to those of skill in the art.

The parse tree(s) for a statement containing the assignment in this location in the program is modified to implement/accept code from Additional Code block 920, which includes the desired additional code statements (or software instructions) to implement the functionality 400 of FIG. 4 and then Code Generation 916 is performed, establishing the functionality of FIG. 4 (e.g., the generated code as illustrated in FIG. 6).

Optimization 926 (known in the art) is performed in compilation if requested (but does not alter the effect of the functionality of FIG. 4). During the link phase 930, library routines aware of the additional symbols, i.e., the collection of variables of the form C.xx and added to the Symbol Table 912, are linked to allow user modification of the C.xx parameters during the use of the Executable Image 940 (the procedure illustrated in FIG. 8). That is, to test new values for variables of the form C.xx generated by the preferred embodiment, routines for accessing and changing the variable modification parameter values, which are stored in libraries that are linked to the program, can be executed as desired, thus avoiding recompilation.

Scoping issues for local variables in routines that are entered and exited repetitively can be avoided by the allocation of the C.xx in the Symbol Table 912 as global variables, and the addition of the code according to the preferred embodiment to a particular subroutine, along with possible name resolution, as necessary, to ensure uniqueness of the C.xx parameters for variables that may go into and out of scope. That is, there is the possibility of "name collision" for names in different subroutines or subprograms that may be identical (e.g., name.xx =name.xx). In this case, the preferred embodiment preferably includes a name resolution scheme (e.g., namea.xx, nameb.xx) whereby all variables can remain global, ready to go into scope when respective subroutines are entered. Such naming schemes are known to those skilled in the art and will therefore not be described.

The C.xx parameters (variable modification parameters) are changeable in accordance with the preferred embodiment as follows. New variables are placed in the symbol tables for xx of the selected, original (legacy) variables involved. These xx are placed globally so they can always be accessed. Being placed globally, the threads (FIG. 8) can access the xx values and their names. The threads of FIG. 8 thus take values from the input device (such as a keyboard) and access the xx parameters, changing them, and thus providing the real-time variable modifications described herein.

The improved compiler functionality described herein is particularly useful when associated with platforms and processes used in real time "Hardware In The Loop" (HWIL) simulations and testing. More particularly, the preferred embodiment is especially useful in simulating and testing for General Electric's MkVI ICS (Integrated Control System) Controller. Of course, the improved compiler described herein is useful in any software program where variable manipulation is desired. Further, it is noted that while Additional Symbols block 910, Additional Code block 920 and block 950 are shown as functionally separate in FIG. 9, the functions of these blocks can be fully incorporated into an existing compiler program. Separation of these blocks from the conventional compilation process is provided primarily for purposes of explanation. Further still, the present invention is operable in the context of any desired compiler platform. That is, it is not limited to any particular compiler platform, CPU and/or instruction set and can be modified accordingly to be implemented in a given environment.

While the foregoing description includes numerous details and specifics, it is to be understood that these are provided for purposes of explanation only, and are not intended to limit the scope of the invention. Those of ordinary skill in the art will easily be able to make numerous modifications to the exemplary embodiments described above without departing from the scope of the invention, as defined by the following claims and their legal equivalents.

What is claimed is:

1. A compiling method providing modification of a value of a variable at run-time of a computer program, comprising the steps of:

allocating additional space in memory for variable modification parameters;

adding, to a compiled version of said computer program, code that is dependent on said variable modification parameters; and based on said code and at least one of said variable modification parameters, modifying said value of said variable at run time of said computer program to be equivalent to at least one of a default value, a value multiplied by a predetermined gain and a value offset from said value of said variable, and wherein one of said variable modification parameters controls a multi-position software switch.

2. The method of claim 1, further comprising initiating said method via a compiler switch.

3. The method of claim 1, further comprising at least one of tuning and scaling said variable.

4. The method of claim 1, further comprising generating a fault value instead of said variable.

5. The method of claim 1, further comprising controlling the application of said method to individual variables via at least one of a software switch, an auxiliary file and a compiler directive.

6. The method of claim 1, further comprising initializing, storing and providing access to said variable modification parameters.

7. The method of claim 1, wherein said step of modifying comprises conditional tests and jumps operable based on at least one of said variable modification parameters.

8. The method of claim 1, wherein said multi-position software switch includes settings wherein (a) both gain and offset are applied to said value, (b) gain and offset are applied to a fault value and (c) said value is passed in an unmodified form.

9. The method of claim 1, wherein variable modification routines are stored in a library linked to said computer program during said compiling method.

10. The method of claim 1, wherein said computer program is a simulation.

11. The method of claim 1, wherein said method is integral with one of a FORTRAN, COBOL and C/C++ compiling method.

12. The method of claim 1, further comprising storing said variable modification parameters at predetermined addresses referenced from an address of said variable.

13. The method of claim 1, further comprising providing threads between said variable modification parameters a compiled version of said computer program.

14. The method of claim 1, further comprising adding to a symbol table symbols representative of said variable modification parameters.

15. The method of claim 1, further comprising identifying an assignment operator associated with said variable to initiate said allocating step.

16. A compiler for providing modification of a value of a variable at run-time of a computer program, comprising:

means for allocating additional space in memory for variable modification parameters;

means for adding, to a compiled version of said computer program, code that is dependent on said variable modification parameters; and means for modifying, based on said code and at least one of said variable modification parameters, said value of said variable at run time of said computer program to be equivalent to at least one of a default value, a value multiplied by a predetermined gain and a value offset from said value of said variable, and wherein one of said variable modification parameters controls a multi-position software switch.

17. The compiler of claim 16, further comprising a compiler switch.

18. The compiler of claim 16, further comprising means for at least one of tuning and scaling said variable.

19. The compiler of claim 16, further comprising means for generating a fault value instead of said variable.

20. The compiler of claim 16, further comprising means for controlling the application of said means for modifying to individual variables via at least one of a software switch, an auxiliary file and a compiler directive.

21. The compiler of claim 16, further comprising means for initializing, storing and providing access to said variable modification parameters.

22. The compiler of claim 16, wherein said means for modifying comprises software instructions including conditional tests and jumps operable based on said variable modification parameters.

23. The compiler of claim 16, wherein said multi-position software switch includes settings wherein (a) both gain and offset are applied to said value, (b) gain and offset are applied to a fault value and (c) said value is passed in an unmodified form.

24. The compiler of claim 16, wherein variable modification routines are stored in a library linked to said computer program upon compilation.

25. The compiler of claim 16, wherein said computer program is a simulation.

26. The compiler of claim 16, wherein said compiler is one of a FORTRAN, COBOL and C/C++ compiler.

27. The compiler of claim 16, further comprising means for storing said variable modification parameters at predetermined addresses referenced from an address of said variable.

28. The compiler of claim 16, further comprising means for providing threads between said variable modification parameters and a compiled version of said computer program.

29. The compiler of claim 16, further comprising means for adding to a symbol table symbols representative of said variable modification parameters.

30. The compiler of claim 16, further comprising means for identifying an assignment operator associated with said variable to initiate said means for allocating.

31. A compiling method providing modification of a value of a variable at run-time of a computer program, comprising the steps of:

allocating additional space in memory for variable modification parameters;

adding, to a compiled version of said computer program, code that is dependent on said variable modification parameters; and based on said code and at least one of said variable modification parameters, modifying said value of said variable at run time of said computer program to be equivalent to at least one of a default value, a value multiplied by a predetermined gain and a value offset from said value of said variable; and wherein said step of modifying comprises conditional tests and jumps operable based on at least one of said variable modification parameters; and wherein one of said variable modification parameters controls a multi-position software switch.

* * * * *